United States Patent [19]
Schaty

[11] Patent Number: 5,991,984
[45] Date of Patent: Nov. 30, 1999

[54] HOLDER MADE OF PLASTICS MATERIAL WITH PIVOTAL HOLDING ELEMENTS

[75] Inventor: Harald Schaty, Wetzlar-Dutenhofen, Germany

[73] Assignee: Emhart Inc., Newark, Del.

[21] Appl. No.: 09/105,289

[22] Filed: Jun. 26, 1998

[30] Foreign Application Priority Data

Jun. 27, 1997 [DE] Germany .................. 297 11 251 U

[51] Int. Cl.⁶ .................................................. F16B 13/04
[52] U.S. Cl. ............................ 24/609; 411/55; 411/21; 411/344
[58] Field of Search ............................ 24/609, 608, 607, 24/604, 508, 297, 453; 411/502, 510, 41, 44, 45, 57, 55, 340–343, 344, 21

[56] References Cited

U.S. PATENT DOCUMENTS

| | | | |
|---|---|---|---|
| 2,164,447 | 7/1939 | Clarke | 24/609 |
| 2,499,712 | 3/1950 | Armstrong | 24/609 X |
| 4,693,389 | 9/1987 | Kalen | 411/55 X |
| 5,195,857 | 3/1993 | Hiramoto | 411/344 |
| 5,417,531 | 5/1995 | Brown | 411/21 X |
| 5,775,861 | 7/1998 | Leon et al. | 411/344 |

*Primary Examiner*—James R. Brittain
*Assistant Examiner*—Robert J. Sandy
*Attorney, Agent, or Firm*—Edward D. Murphy

[57] ABSTRACT

A plastic holder having a base and a journal formed thereon. The plastic holder further having a holding element. The holding element includes an articulating bore for receiving the journal of the base. The journal includes a smaller cross section than the articulating bore. The holding element is pivotable about the journal and positionable into a basic position and a locked position. The articulating bore partially resting on the journal when the holding element is in the locked position.

21 Claims, 2 Drawing Sheets

HOLDER MADE OF PLASTICS MATERIAL WITH PIVOTAL HOLDING ELEMENTS

The present invention relates to a holder made of a plastics material with pivotal holding elements.

A holder made of a plastics material comprising pivotal holding elements is known from JP-A1 61-133266. The holder has a base body on which pivotal holding elements are articulated. The holding elements can be pivoted from a basic position into a locked position. The holding elements are connected to the base body by a film hinge.

A holder of this type is used for fixing, for example, insulating mats on a structure, in particular a motor vehicle body. The holder according to JP-A1 61-133266 is connected to a weld stud. Therefore, it is not necessary initially to connect the weld stud to the body and then to arrange the holder on the stud.

A problem with the holder known from JP-A1 61-133266 is that only relatively low forces for fixing, for example, an insulating mat are possible owing to the hinge-like connection between the holding elements and the base body. Moreover, there is a risk with so-called film hinges that this will break as a film hinge is a weakened portion of material.

With the holder known from JP-A1 61-133266, it cannot be ensured that the holding elements will invariably maintain their basic position during handling of the holder.

It is an object of the present invention to provide a holder by means of which the above disadvantages can be reduced or substantially obviated. It is a further object of the present invention to provide a holder with which it is ensured that the holding elements are not unintentionally pivoted from their basic position.

The present invention provides a holder made of a plastics material with a base body and with at least one holding element which is pivotable about an axis formed on the base body from a basic position into a locked position, characterised in that the axis is formed by at least one journal of which the cross section is smaller than a cross section of at least one articulating bore formed on the holding element, wherein the holding element and the base body are so designed that the articulating bore rests partially on the journal in the locked position.

The holder according to the invention made of a plastics material has a base body an at least one holding element which is pivotable around an axis formed on the base body. The holding element can be pivoted from a basic position into a locked position. The axis is formed by at least one journal. The holding element has at least one articulating bore in which the journal engages. The cross section of the journal is smaller than a cross section of the articulating bore. The holding element and the base body are designed such that the articulating bore rests partially on the journal in the locked position. This ensures that the holding element can be pivoted from the locked position only against the action of a removing force. As the at least one holding element is articulated to the base body via a journal, the holding element can introduce greater forces into a component.

The holder is preferably designed so that the base body has at least one web by means of which the holding element is held in the basic position. Because of this design of the holder, the holder can automatically be supplied to a handling device as it is ensured that the holding element adopts and maintains a predetermined location in the basic position. This design of the holder also simplifies the fitting of, for example, insulating mats on the holder. The operator does not have to fear that the holding elements will be removed from their basic position when an insulating mat is slipped over the holder.

According to a further advantageous design of the holder, it is proposed that the web press the wall of the articulating bore of the holding element partially against the journal. This design ensures that unintentional lifting of the holding element from the locked position is avoided.

According to a further advantageous design of the holder, it is proposed that the web be shaped on the holding element and on the base body. The web has a predetermined breaking point at which the web breaks when the holding element is pivoted from the basic position into a locked position. Particularly reliable fixing of the holding elements in the basic position is achieved in this way.

According to a further advantageous design, a holder is proposed in which the holding element is connected in a locked manner to the web in the locked position. The web is preferably resilient in design so locking is achieved with a relatively slight expenditure of force.

A design of the web is preferred in which the web is directed substantially against the pivoting direction from the locked position into the basic position. The web therefore acts in the manner of a barb. It is essentially directed in the direction of a pivoting movement of the holding element from the basic position into the locked position, so the holding element can be brought from the basic position into the locked position with a relatively slight force.

According to a further advantageous design, a holder is proposed in which the web is formed in one piece with the base body. This reduces the production cost of the holder.

According to a further advantageous design of the holder it is proposed that the holding element should extend substantially in the longitudinal direction of the holder in the basic position. A particularly suitable holder is created in this way, which can be used for automatic feeding.

According to a further advantageous design of the invention, a holder is proposed which comprises a socket in which a connecting element can be arranged. A design of the holder in which a through-orifice opens into the socket is preferred. The design of such a holder has the advantage that it can be welded to a structure by the electric arc welding process, in particular in conjunction with a welded part. The particular suitability is achieved in that the contacting of a contact piece of a welding device with the metallic connecting element can be achieved in that the contact piece of the welding device can extend through the through-orifice into the socket and can be brought into contact with a contact face of the connecting element. The through-orifice can be sealed after the welding process, so oxidation of the connecting element is avoided.

An embodiment of a holder will now be described with reference to the accompanying drawings, in which.

Figure 1:
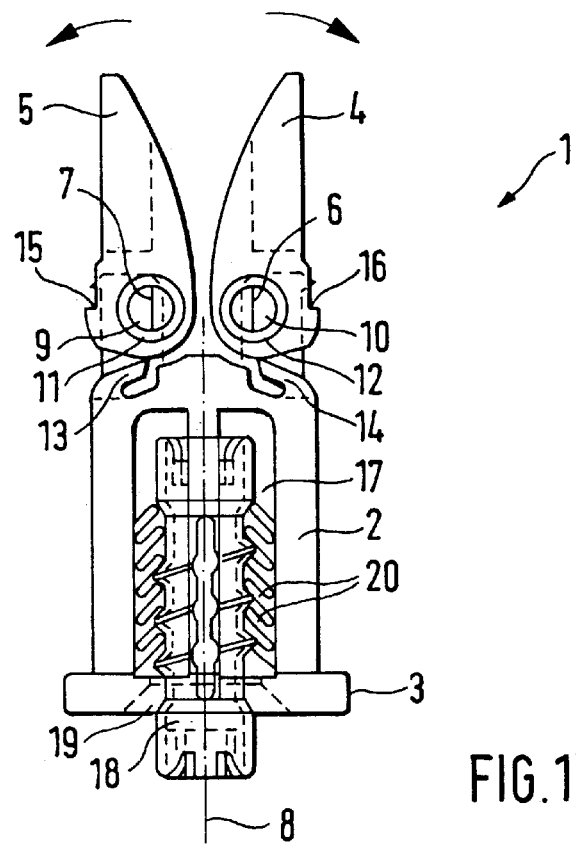
FIG. 1 is a front view of a holder.
Figure 2:
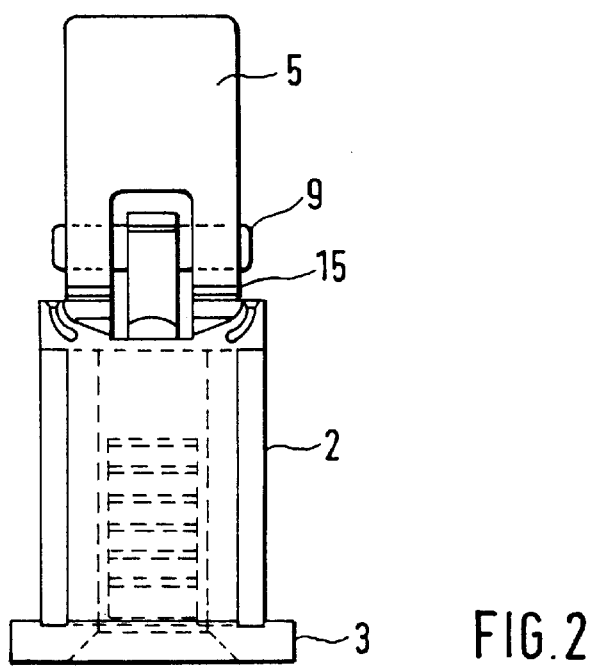
FIG. 2 is a side view of the holder from the left.
Figure 3:
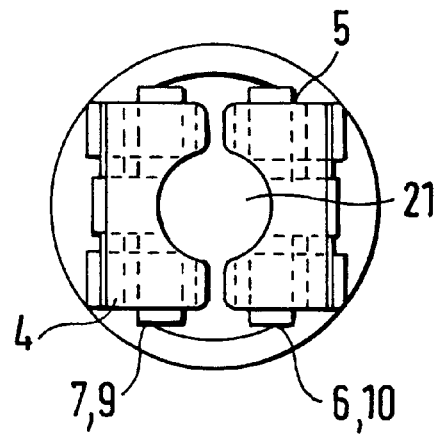
FIG. 3 is a plan view of the holder.
Figure 4:
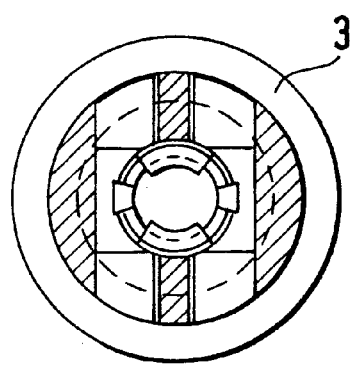
FIG. 4 is a sectional view along section line A—A in FIG. 1.

FIG. 1 is front view of the holder 1. The holder 1 has a base body 2. The base body 2 is substantially cylindrical in design. A peripheral flange 3 is formed on one end region of the base body 2 and comes to rest on a structure, not shown, in the fitted state of the holder 1. Two holding elements 4, 5 are formed at the end of the base body 2 remote from the flange 3. The holding elements 4, 5 are each pivotal round an axis 6, 7 formed on the base body 2. The axes 6, 7 extend in a common plane extending substantially perpendicularly to the longitudinal axis 8.

The axes 6, 7 are designed physically in the form of journals 9, 10. Each holding element 4, 5 has an articulating bore 11, 12 in which the respective journal 9, 10 is arranged. As shown, in particular, in FIG. 1, the journals 9, 10 have a cross section which is smaller than the cross section of the corresponding articulating bores 11, 12. In the basic position of the holding elements 4, 5, the axes of the articulating bores 11, 12 are coaxial to the axes 6, 7 of the journals 9, 10. The holding elements 4, 5 are held by webs 13, 14 in this basic position.

Figure 5:
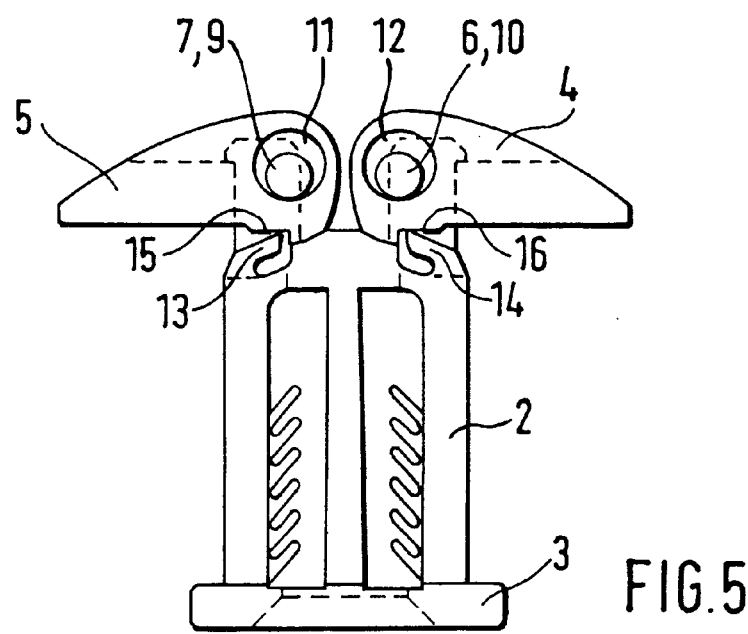
FIG. 5 shows the holder with holding elements in a locked position.

The webs 13, 14 are formed on the base body 2. Each web 13, 14 is directed in the direction of a pivoting movement of the respective holding element 4, 5. The holding element 4 or 5 has a recess 15 or 16 in which the respective web 13, 14 engages when the holding element 4 or 5 has been pivoted from the basic position into a locked position, as shown in FIG. 5. The holding element 4, 5 is pressed by the web 14 or 13 in this locked position against the journal 10 or 9, as shown in FIG. 5.

The webs 13, 14 can be shaped both on the holding element 4 or 5 and on the base body 2. With such a design, the webs each have a set breaking point in the region of the holding elements. If a holding element is transferred from a basic position into a locked position, a corresponding web breaks at the predetermined breaking point.

In the embodiment illustrated, the base body 2 has a socket 17 in which a connecting element 18 can be arranged. For this purpose, the socket 17 has an inlet orifice 19 through which the connecting element 18 can be introduced into the socket 17. Locking fingers 20 which come to rest on the connecting element 18 are provided for fixing the connecting element 18 in the socket 17. The connecting element 18 can be connected to a metallic structure, not shown, by the electric arc welding process. To simplify the contacting of the connecting element 18 with a contact piece of a welding device, the holder 1 has a through-orifice 21 which is formed in its end face and opens in the socket 17. The holding elements 4, 5 are so designed that they leave the through-orifice 21 open. A contact piece of a welding device, not shown, can be brought into contact with the connecting element 18 through the through-orifice 21.

What is claimed is:

1. A holder being made of a plastics material, said holder comprising:

a base;

a journal being formed on said base; and a holding element having an articulating bore formed therein for receiving said journal of said base, said journal having a smaller cross section than said articulating bore thereby defining a gap therebetween, said holding element being pivotable about said journal and positionable into a basic position and a locked position, said articulating bore only partially resting on said journal when said holding element is in said locked position.

2. The holder according to claim 1, further comprising:

a web mounted on said base, said web retaining said holding element in said basic position.

3. The holder according to claim 2 wherein said web partially presses said articulating bore of said holding element against said journal in said locked position.

4. The holder according to claim 2 wherein said web is formed on said holding element and on said base, said web includes a predetermined breaking point at which said web breaks when said holding element is pivoted from said basic position to said locked position.

5. The holder according to claim 2 wherein said holding element is connected in a locking manner to said web in said locked position.

6. The holder according to claim 2 wherein said web is formed generally in the direction of said pivoting movement of said holding element from said basic position to said locked position.

7. The holder according to claim 2 wherein said web is resilient.

8. The holder according to claim 2 wherein said web is integrally formed with said base.

9. The holder according to claim 1 wherein said holding element extends substantially parallel to the longitudinal direction of said base in said basic position.

10. The holder according to claim 1, further comprising:

a socket formed in said base, said socket being adaptable for receiving a connecting element therein.

11. The holder according to claim 10 wherein said socket includes a through-orifice.

12. A plastic holder comprising:

a base;

a journal being formed on said base;

a holding element having an articulating bore formed therein for receiving said journal of said base, said journal having a smaller cross section than said articulating bore, said holding element being pivotable about said journal and positionable into a basic position and a locked position, said articulating bore partially resting on said journal when said holding element is in said locked position; and a web formed on said base, said web retaining said holding element in said basic position.

13. The plastic holder according to claim 12 wherein said web has a predetermined breaking point at which said web breaks when said holding element is pivoted from said basic position to said locked position.

14. The plastic holder according to claim 12, wherein said holding element is connected in a locking manner to said web in said locked position.

15. The plastic holder according to claim 12 wherein said holding element is connected in a locking manner to said web in said locked position.

16. The holder according to claim 12 wherein said web is formed generally in the direction of said pivoting movement of said holding element from said basic position to said locked position.

17. The holder according to claim 12, further comprising:

a socket formed in said base, said socket being adaptable for receiving a connecting element therein.

18. A holder comprising:

a base;

a journal being formed on said base;

a holding element having an articulating bore formed therein for receiving said journal of said base, said journal having a smaller cross section than said articulating bore, said holding element being pivotable about said journal and positionable into a basic position and a locked position, said articulating bore partially resting on said journal when said holding element is in said locked position; and a resilient web integrally formed on said base, said web retaining said holding element in said basic position, said web partially pressing said articulating bore of said holding element against said journal in said locked position.

19. The holder according to claim 18 wherein said web has a predetermined breaking point at which said web breaks when said holding element is pivoted from said basic position to said locked position.

20. The holder according to claim 18, further comprising:
a socket formed in said base, said socket being adaptable for receiving a connecting element therein.

21. A plastic holder comprising:

a base body;

a journal being formed on said base body;

a holding element having an articulating bore formed therein for receiving said journal of said base body, said journal having a smaller cross section than said articulating bore thereby defining a gap therebetween, said holding element being pivotable about said journal and positionable into a basic position and a locked position, said articulating bore only partially resting on said journal when said holding element is in said locked position; and a web mounted on said base body, said web retaining said holding element in said basic position, said web having a predetermined breaking point at which said web breaks when said holding element is pivoted from said basic position to said locked position.

* * * * *